(12) United States Patent
Naveh et al.

(10) Patent No.: US 7,412,569 B2
(45) Date of Patent: Aug. 12, 2008

(54) SYSTEM AND METHOD TO TRACK CHANGES IN MEMORY

(75) Inventors: Alon Naveh, Ramat Hasharon (IL); Abraham Mendelson, Haifa (IL)

(73) Assignee: Intel Corporation, Santa Clara ( * ) Notice: Subject to any disclaimer, the term of this patent is extended or adjusted under 35 U.S.C. 154(b) by 225 days.

(21) Appl. No.: 10/410,261

(22) Filed: Apr. 10, 2003

(65) Prior Publication Data

US 2004/0205303 A1    Oct. 14, 2004

(51) Int. Cl.
 *G06F 12/00* (2006.01)
 *G06F 13/00* (2006.01)
(52) U.S. Cl. .................. 711/144; 711/3; 711/113; 711/118; 711/122; 711/133; 711/156; 711/159; 711/168; 711/220
(58) Field of Classification Search ............. 711/3, 711/2, 122, 168, 220, 113, 118, 144, 133, 711/156, 159
See application file for complete search history.

(56) References Cited

U.S. PATENT DOCUMENTS 5,136,700 A * 8/1992 Thacker ............. 711/122
6,047,354 A * 4/2000 Yoshioka et al. ............. 711/118
6,240,506 B1 * 5/2001 Miller ............. 712/213
6,507,898 B1 * 1/2003 Gibson et al. ............. 711/168
2002/0016900 A1 * 2/2002 Miller ............. 711/220
2004/0030834 A1 * 2/2004 Sharma ............. 711/122
2004/0123040 A1 * 6/2004 Jung et al. ............. 711/135
2004/0139234 A1 * 7/2004 Quach et al. ............. 709/248
2005/0027911 A1 * 2/2005 Hayter et al. ............. 710/62

* cited by examiner

*Primary Examiner*—Hyung Sough
*Assistant Examiner*—Mardochee Chery
(74) *Attorney, Agent, or Firm*—Pearl Cohen Zedek Latzer LLP

(57) ABSTRACT

Briefly, a system and a method to efficiently track changes in memory or storage areas, for example, in cache memories of computers and electronic systems. A method in accordance with an exemplary embodiment of the invention includes, for example, updating a tracking list with an address and/or a corresponding address to be updated of a changed entry in an intermediate memory. A system in accordance with an exemplary embodiment of the invention may include, for example, a tracking unit to track the locations of potential data discrepancies between a reference memory and an intermediate memory.

51 Claims, 2 Drawing Sheets

SYSTEM AND METHOD TO TRACK CHANGES IN MEMORY

BACKGROUND OF THE INVENTION

Computer systems and computing devices may use intermediate memory units or storage areas to store data temporarily and to speed-up various operations. An Intermediate Memory (IM) may include any memory or storage area, for example, a level-1 cache memory. Often, an IM may store data for short periods of time, until such data is copied from the IM to a longer-term memory or storage area, for example, a level-2 or higher cache memory or a system memory, which may be referred to as a Reference Memory (RM). Often, an IM may be accessed more quickly and more readily than a RM. During operation, a computerized system or processor may access the IM, thereby avoiding time-consuming access to the RM. From time to time, or upon a specific request by an application, an update operation may be performed to update the RM with changed values stored temporarily in the IM.

During operation of a processing system, the IM may be written and re-written with new data, thereby creating a discrepancy between data stored in the IM and data stored in the RM. This discrepancy may increase in time, for example, if the RM is not accessed and/or not updated frequently. The discrepancy in data between the IM and the RM may be problematic or undesired, for example, when an application requires updating the RM with accumulated changes at specific times, which may require a long processing time.

A system may prevent overloading due to unnecessary data transfers by copying data from the IM to the RM only as needed for proper data utilization, for example, when a need arises for a device to access a shared section of the RM that may have been modified in the IM, or upon eviction of the IM due to storage limitations. Problems may arise when an application or other circumstances require updating of the RM with accumulated changes at a certain point in time, for example, when a need arises to "flush" a cache memory, i.e., to transfer or copy all the content of the cache memory and empty or otherwise free the entire cache memory. Since entries in the IM may have been changed unpredictably, to ensure a complete update of the RM, there may be a need to search through the IM for updated entries or copy the entire content of the IM to the RM. Each of these alternatives may require significant processing time and may drain management resources, system power and/or system bandwidth.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
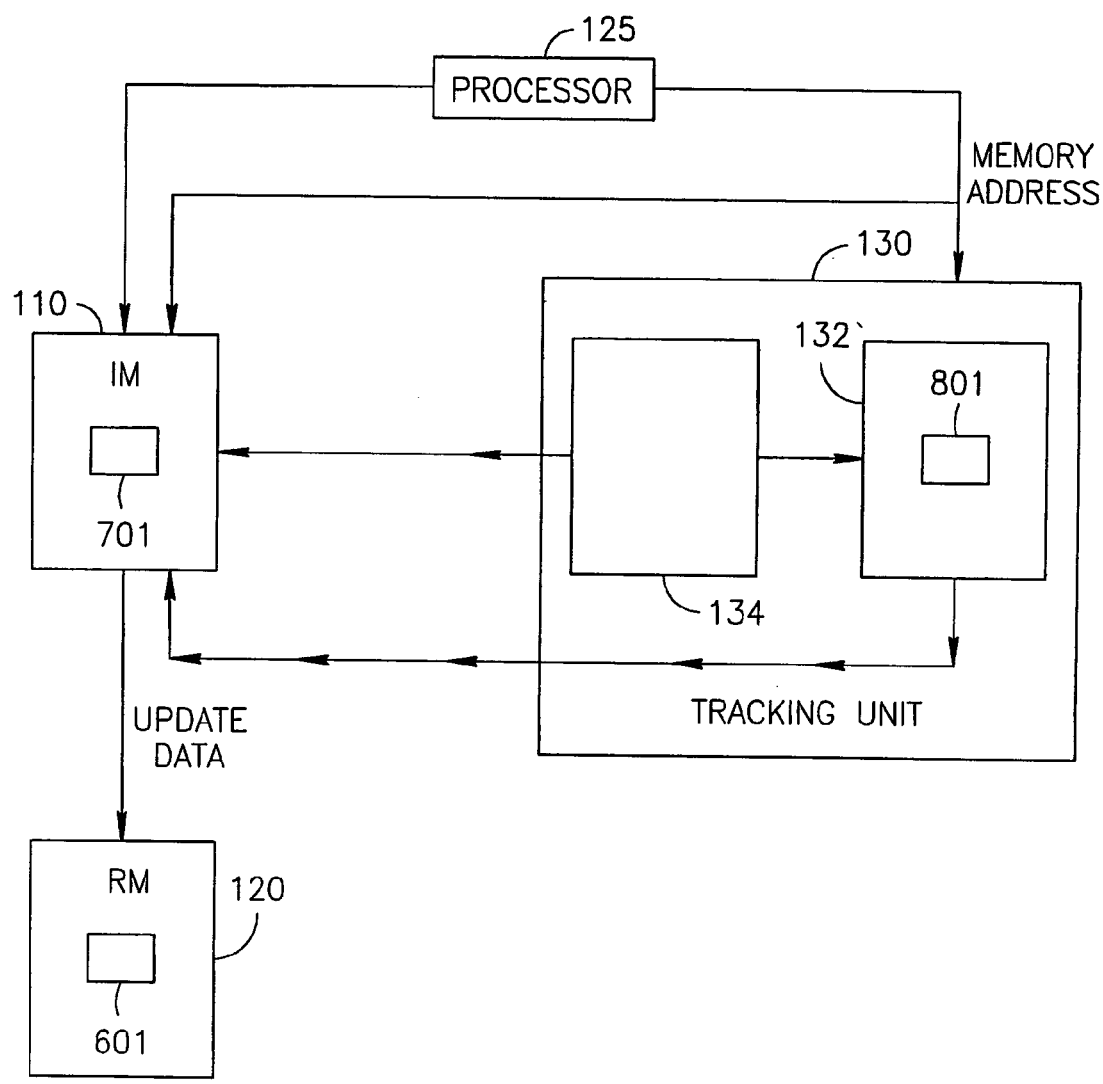
FIG. 1 is a schematic illustration of a system including apparatus to track changes in memory in accordance with an exemplary embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Embodiments of the invention provide a mechanism for tracking changes in memory and/or storage areas, for example, in temporary memories, e.g., cache memories. Embodiments of the invention may include, for example, creating and/or updating a tracking list, including at least one address of a memory entry to be changed or updated, when desired. Thus, embodiments of the invention do not require storing or searching copies of actual memory entries to be updated, thereby making memory updating more space-efficient and/or time-efficient.

FIG. 1 schematically illustrates a system including an apparatus to track changes in memory in accordance with an exemplary embodiment of the invention. The system may include, for example, an Intermediate Memory (IM) 110, a Reference Memory (RM) 120, a tracking unit 130, and an optional processor 125. Although the invention is not limited in this regard, the system of FIG. 1 may be used in conjunction with a processing platform, a computer platform and/or a computing device, for example, a personal computer, a desktop computer, a laptop computer, a server computer, a Portable Digital Assistant (PDA) device, a tablet computer, or the like.

In embodiments of the invention, processor 125 may include, for example, a Central Processing Unit (CPU), a Digital Signal Processor (DSP), a chip, a microchip, or any other suitable multi-purpose or specific processor. IM 110 may include any suitable type of memory or storage area, for example, a temporary memory such as, e.g., a region of a level-1 cache memory, associated with processor 125 and/or operating in a write-back mode. RM 120 may include any suitable memory or storage area, such as, for example, a region of a level-2 cache memory or an external system memory.

Although the invention is not limited in this regard, in embodiments of the invention, IM 110 and/or RM 120 may include any suitable type of memory device, memory unit, storage area and/or storage unit, such as, for example, Random Access Memory (RAM), flash memory, removable or non-removable media, erasable or non-erasable media, writable or re-writable media, digital or analog media, hard disk, floppy disk, Compact Disk Rewriteable (CD-RW), optical disk, magnetic media, various types of Digital Versatile Disks (DVDs), or a tape. Additionally, in embodiments of the invention, information may be stored in IM 110 and/or RM 120 using any suitable method or format as is known in the art, for example, in a sequential or non-sequential order, and/or using any combination of a table, an array, an object, a record, a field, a line, an entry, a lookup table, a database, a file, a list, a string, or any other suitable format At a given point in time, the content stored in RM 120 may or may not be identical to the content stored in IM 110. In an embodiment of the invention, processor 125 may perform various processing operations and may read and write data, thereby changing the data in IM 110. Furthermore, in some embodiments of the invention, the data in IM 110 may be defined as exclusive, whereby the system may not send updates from IM 110 to RM 120 until a predefined criterion is met, e.g., as long as there is free and/or available storage space in IM 110.

In an embodiment of the invention, as data is written onto IM 110, a tracking unit 130 may be used to store a list of memory addresses and/or pointers to storage areas where data is written and/or needs to be written. Tracking unit 130 may, for example, point to a memory address in RM 120 that has not yet been updated with a new or changed entry of IM 110. Additionally or alternatively, in an exemplary embodiment of the invention, tracking unit 130 may point to a memory address in IM 110 that stores data not yet copied onto RM 120.

In accordance with embodiments of the invention, tracking unit 130 may track, using any of various formats, the locations of possible discrepancies between data stored in IM 110 and data stored in RM 120. Specifically, in an embodiment of the invention, tracking unit 130 may register, in any of various suitable methods, the addresses of data entries in IM 110 that have been changed and, therefore, may be inconsistent with corresponding data entries in RM 120. For example, a pointer or pointers to the corresponding memory addresses in IM 110 and/or RM 120 may be used to register the addresses of such possible discrepancies or inconsistencies.

An update to RM 120 may be requested by an application, or may be required by external and/or internal circumstances, for example, a "flush" operation may be required upon reaching the maximum storage capacity of 110, or a hardware failure may occur requiring immediate data transfer. In such case, in embodiments of the invention, only entries and/or data pointed to or otherwise tracked by tracking unit 130 may be copied from IM 110 to RM 120. Although the invention is not limited in this regard, in an exemplary embodiment of the invention, data may be copied from IM 110 to RM 120 if tracking unit 130 registers or otherwise flags the location of such data as, for example, "new", "changed" or "updated", indicating that such data needs to be copied from IM 110 to RM 120. It is noted that, in accordance with an exemplary embodiment of the invention, tracking unit 130 does not store the actual data that needs to be copied from IM 110 to RM 120; instead, tracking unit 130 may store pointers or other indication of the location of data that needs to be copied from IM 110 to RM 120.

In embodiments of the invention, data may be copied from IM 110 to RM 120 according to pointers or other indicators stored in tracking unit 130. This may be performed, for example, when tracking unit 130 reaches a predefined threshold of pointers, or when tracking unit 130 reaches a maximum level or a predefined percentage of its storage capacity.

In embodiments of the invention, tracking unit 130 may include two sub-units, namely, tracking list 132 and tracking controller 134. Tracking list 132 may list data describing or pointing to updates that need to be performed in RM 120, as detailed above. Tracking list 132 may be implemented, for example, using a memory unit, a memory area, a storage medium, a storage area, an array, a database, a registry, a buffer, a list, a table, a lookup table, a computer file, a pointer, a set of pointers, or other suitable implementations for registration, listing or reference.

In embodiments of the invention, tracking controller 134 may include a processor, which may be implemented by hardware and/or software, to perform operations associated with tracking the changed memory locations in IM 110 and/or the corresponding locations to be updated with data in RM 120. In an exemplary embodiment of the invention, tracking controller 134 may write pointers into tracking list 132, may read pointers from tracking list 132, or may search pointers stored in tracking list 132, or using any other desirable configuration.

Tracking list 132 and/or tracking controller 134 may be implemented by software, by hardware, or by any combination of software and/or hardware as may be suitable for specific applications or in accordance with specific design requirements. It is noted that in embodiments of the invention, tracking list 132 and tracking controller 134 may be implemented in one integrated unit, or using two or more sub-units.

It will be appreciated by persons skilled in the art that, in accordance with embodiments of the invention, the size, capacity, or other characteristics of tracking list 132 may be pre-defined and/or re-defined or optimized from time to time, e.g., to accommodate an expected and/or predefined update rate of RM 120 and/or in order to achieve efficiency, performance and/or design goals. Such optimization may be performed, for example, by taking into account the desire to reduce or eliminate overly frequent updates of RM 120, on one hand, while limiting the required size of tracking list 132, on the other hand. It is noted that in embodiments of the invention, such optimization may be pre-defined as a factory setting, or may be dynamically performed. For example, in an embodiment of the invention, the size or other characteristics of tracking list 132 may be evaluated and/or re-defined by tracking controller 134 at pre-defined time intervals or upon occurrence of predetermined events. Further, optimization of tracking list 132 may be preformed by tracking controller 134, for example, in real time or upon reaching a certain percentage of the maximum capacity of tracking list 132.

It is noted that in embodiments of the invention, copying data from IM 110 to RM 120 according to pointers or other indicators stored in tracking unit 130 may be performed, for example, using processor 125, tracking controller 134, and/or any other suitable general-purpose or dedicated unit, sub-unit, processor and/or controller, implemented using any suitable combination of hardware and/or software.

Figure 2:
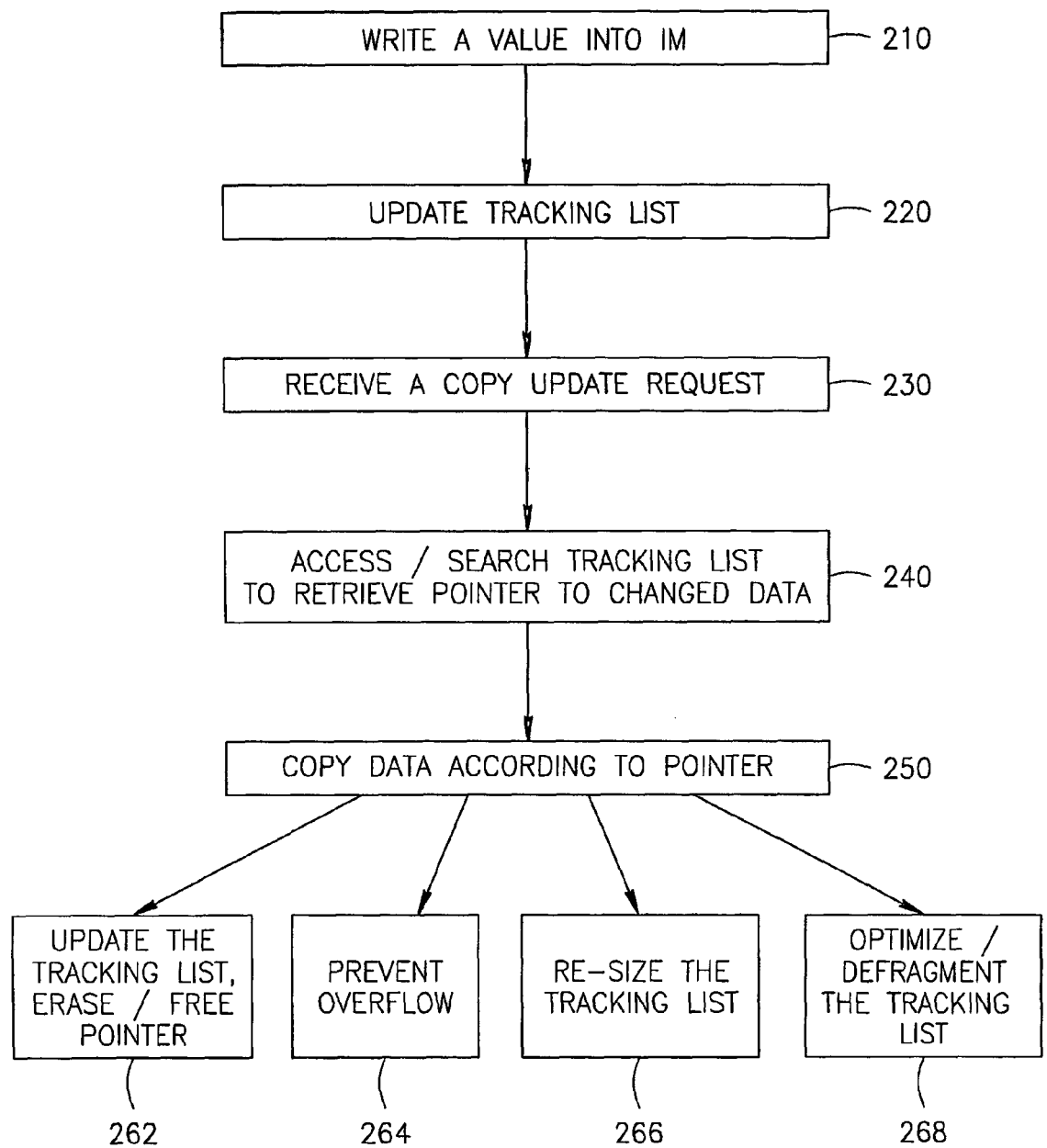
FIG. 2 is a schematic flowchart depicting a method of tracking changes in memory in accordance with an exemplary embodiment of the invention.

Reference is now made also to FIG. 2, which schematically illustrates a method of tracking updates in storage areas in accordance with exemplary embodiments of the invention. The method of FIG. 2 is described in the context of updating cache memories of a computer system; however, it will be appreciated by persons skilled in the art that the principles of the method of FIG. 2 are also applicable to other memory-update situations.

As indicated at block 210, the method may begin when a new or changed value is stored at an address of IM 110, without changing the value stored at the corresponding address of RM 120. For example, address 601 of RM 120 may contain the value "X", while the content of address 701 of IM 110 may have been changed to the value "Y". Tracking list 132 may store a plurality of pointers, for example, pointer 801. As indicated at block 220, pointer 801 of tracking list 132 may be written with a value pointing to a location in IM 110 and/or RM 120 where there may be a discrepancy between the data stored in the two memories, e.g., between the data stored at address 701 of IM 110 and the data stored at address 601 of RM 120. For example, pointer 801 in tracking list 132 may be written with the value "701", "601", "701/601", or any other reference to the location of address 701 and/or address 801 in their respective memories.

As indicated at block 230, during operation of the system, a request may be received, for example, to fully update RM 120 or to specifically update address 601 of RM 120. As indicated at block 240, upon receiving the update request, tracking controller 134 may access and/or search tracking list 132, to find pointers to required updates, for example, pointer 801 to address 601 of RM 120 and/or to address 701 of IM 110. Upon finding such a pointer in tracking list 132, as indicated at block 250, the value stored in address 701 of IM 10 may be copied to address 601 of RM 120.

In an embodiment of the invention, optionally, as indicated at block 262, the content of tracking list 132 may be modified to reflect that an update was performed, and/or to free up memory space in tracking list 132. For example, pointer 801 in tracking list 132 may be erased, replaced with null content, flagged as "free" or as "available" to be written over, or otherwise freed or erased, using any suitable method.

Additionally or alternatively, as indicated at block 264, from time to time or after an update request has been received, a check may be performed in order to prevent overflow, e.g., to verify that IM 110 and/or tracking list 132 have sufficient capacity to store additional entries, data or pointers. If an overflow is detected, or if the system checks and predicts that an overflow may occur within one or more operations, then the system may perform tasks to prevent and/or rectify the overflow. Such prevention and rectification tasks may include, for example, a "flush" operation for copying all accumulated changes tracked by tracking list 132, or a resizing or redefinition of tracking list 132 to accommodate additional entries.

Additionally or alternatively, as indicated at block 266, the size, dimensions and/or other characteristics of tracking list 132 may be dynamically changed or redefined, to accommodate specific needs as may be required, for example, by an application. In an embodiment of the invention, such changes or redefinitions may, for example, increase or decrease the storage capacity of tracking list 132, add, remove or modify dimensions, fields, records or pointers in tracking list 132, or create one or more tracking lists in addition to or instead of tracking list 132.

Additionally or alternatively, in an embodiment of the invention, as indicated at block 268, optimization of tracking list 132 may be performed from time to time, e.g., to optimize system performance and/or increase efficiency. Such optimization may include, for example, defragmenting the data stored in tracking list 132, or defragmenting tracking list 132 or a part thereof. Embodiments of the invention may sort data stored in tracking list 132 in accordance with any suitable criterion, for example, based on memory addresses in RM 120.

Although the scope of the invention is not limited in this respect, embodiments of the invention may yield the following benefits. For example, according to embodiments of the invention, the space required for listing addresses in tracking list 132 may be smaller, often significantly smaller, than the space required for listing the actual data entries that needs to be written onto RM 120. For example, if the total size of IM 110 is 16 kilobytes, and IM 110 is divided into fields of data, wherein each data field in IM 110 has a size of 64 bytes, then IM 110 may contain 256 data fields and, thus, only 8 bits per address may be required for each pointer in tracking list 132 pointing to a corresponding 64 bytes data field in IM 110. This may be significantly efficient, for example, in terms of memory usage.

Embodiments of the invention may allow performing "write" operations using IM 110, which may be faster and/or smaller than RM 120, independently of the operations of RM 120. Embodiments of the invention may be faster and/or more efficient in comparison, for example, to a traditional write-through mechanism, in which a processor may write data onto both the IM and the RM to assure coherency. Such traditional write-through mechanisms may keep the RM updated, but may result in write latency, i.e., a delay between requesting and performing a "write" operation. In contrast, embodiments of the invention may achieve consistency between the contents of the IM and the RM without undesired write latency, or with minimized write latency.

In embodiments of the invention, the percentage of non-updated data in RM 120 may be controlled. Such control may be performed, for example, by setting, limiting, changing and/or regulating the size of tracking list 132. In an exemplary embodiment of the invention, an update time may be limited to a certain maximum value, as a pre-defined factory setting and/or as a dynamically controlled setting. This may reduce the total latency of related operations dependent on the completion of the RM update, for example, bringing a processor to an off-line state, or performing a "flush" operation to a cache memory, e.g., before an Advanced Configuration and Power Interface (ACPI) state transition.

An embodiment of the invention may shorten the time required for a memory, e.g., a cache memory, to perform a "flush" operation. In conventional systems, an internal cache memory does not track data updates, and therefore a "flush" operation may require a long, e.g., sequential search for updated data. Embodiments of the invention may shorten the time period needed to perform the update, for example, by providing the list of pointers to changed data, e.g., tracking list 132, and by performing updates according to the list.

It is noted that although embodiments of the invention may be used, for example, in conjunction with temporary memory units, e.g., cache memory units, the scope of the invention is not limited in this respect. Embodiments of the invention may be used to track changes between, for example, storage areas, storage devices, short-term or long-term memory units, computer files, hard disks, buffers, arrays, databases, registries, and various other types of storage areas and storage mediums.

Additionally, although embodiments of the invention may be used, for example, to track updates between two memory units, the scope of the invention is not limited in this regard. For example, embodiments of the invention may be used to track changes between three or more memory units, e.g., three or more temporary memory units.

Some embodiments of the invention may be implemented, for example, using a machine-readable medium or article which may store an instruction or a set of instructions that, if executed by a machine, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, e.g., memory, removable or non-removable media, erasable or non-erasable media, writable or re-writable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, assembly language, machine code, or the like.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors, or devices as are known in the art. Some embodiments of the invention may include buffers, registers, storage units and/or memory units, for temporary or long-term storage of data or in order to facilitate the operation of a specific embodiment.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. An apparatus comprising:
   a processor associated with an intermediate memory and a reference memory; and
   a tracking unit, operably coupled to said processor, storing a variable-size list of addresses of the reference memory corresponding to addresses of one or more changed entries in the intermediate memory, wherein the size of the variable-size list of addresses corresponds to the number of said one or more changed entries, and wherein the processor writes the contents of said intermediate memory exclusive of the contents of said reference memory, wherein updates are only sent from said intermediate memory to said reference memory when a predefined criterion is met, and wherein said reference memory and said intermediate memory arc accessible exclusively by said processor.

2. The apparatus of claim 1, wherein said tracking unit comprises:
   a tracking list storing said list of addresses; and
   a tracking controller updating said tracking list.

3. The apparatus of claim 1, wherein said processor writes entries of said reference memory based on said list of addresses.

4. The apparatus of claim 1, wherein said intermediate memory comprises a level-1 cache memory.

5. The apparatus of claim 1, wherein said reference memory comprises a level-2 cache memory.

6. A processing platform comprising:
   a processor;
   an intermediate memory operatively associated with said processor;
   a reference memory operatively associated with said processor; and
   a tracking unit, operably coupled to said processor, storing a variable-size list of addresses of said reference memory corresponding to addresses of one or more changed entries in said intermediate memory, wherein the size of the variable-size list of addresses corresponds to the number of said one or more changed entries, and wherein the processor writes the contents of said intermediate memory exclusive of the contents of said reference memory, wherein updates are only sent from said intermediate memory to said reference memory when a predefined criterion is met, and wherein said reference memory and said intermediate memory are accessible exclusively by said processor.

7. The processing platform of claim 6, wherein said tracking unit comprises:
   a tracking list storing said list of addresses; and
   a tracking controller updating said tracking list.

8. The processing platform of claim 6, wherein said processor modifies entries of said reference memory based on said list of addresses.

9. The processing platform of claim 6, wherein said intermediate memory comprises a level-1 cache memory.

10. The processing platform of claim 6, wherein said reference memory comprises a level-2 cache memory.

11. A system comprising:
    a processor;
    an intermediate memory operatively associated with said processor;
    a reference memory operatively associated with said processor;
    a tracking unit operably coupled to said processor and storing a variable-size list of addresses of said reference memory corresponding to addresses of one or more changed entries in said intermediate memory, wherein the size of the variable-size list of addresses corresponds to the number of said one or more changed entries and wherein the processor writes the contents of said intermediate memory exclusive of the contents of said reference memory, wherein updates are only sent from said intermediate memory to said reference memory when a predefined criterion is met, and wherein said reference memory and said intermediate memory are accessible exclusively by said processor.

12. The system of claim 11, wherein said tracking unit comprises:
    a tracking list storing said list of addresses; and
    a tracking controller updating said tracking list.

13. The system of claim 11, wherein said intermediate memory comprises a level-1 cache memory.

14. The system of claim 11, wherein said reference memory comprises a level-2 cache memory.

15. A method comprising updating a variable-size tracking list with an address of a reference memory operatively associated with a processor, which address corresponds to an address of a changed entry in an intermediate memory operatively associated with said processor, wherein the size of the variable-size tracking list corresponds to a current number of changed entries in the intermediate memory, wherein said variable-size tracking list is operably coupled to said processor, and wherein the processor writes the contents of said intermediate memory exclusive of the contents of said reference memory, wherein updates are only sent from said intermediate memory to said reference memory when a predefined criterion is met, and wherein said reference memory and said intermediate memory are accessible exclusively by said processor.

16. The method of claim 15, wherein updating the tracking list comprises writing a pointer to an address in said reference memory corresponding to the address of the changed entry in said intermediate memory.

17. The method of claim 15, wherein updating the tracking list comprises writing a pointer to the address of the changed entry in said intermediate memory corresponding to the address in said reference memory.

18. The method of claim 15, further comprising updating said reference memory based on a content of said tracking list.

19. The method of claim 15, further comprising modifying an entry in said reference memory at the address in said reference memory corresponding to the address of the changed entry in said intermediate memory.

20. The method of claim 19, further comprising changing said tracking list to reflect that the address in said reference memory has been updated.

21. The method of claim 15, further comprising updating entries in said reference memory at addresses in said reference memory corresponding to substantially all addresses of changed entries in said intermediate memory.

22. The method of claim 21, wherein updating the entries comprises updating the entries when said tracking list reaches a pre-defined percentage of its storage capacity.

23. The method of claim 21, wherein updating the entries comprises updating the entries when said intermediate memory reaches a pre-defined percentage of its storage capacity.

24. The method of claim 15, further comprising sorting said tracking list.

25. The method of claim 15, further comprising defragmenting said tracking list.

26. The method of claim 15, further comprising changing a property of said tracking list.

27. The method of claim 26, wherein changing the property of said tracking list comprises changing the size of said tracking list.

28. The method of claim 15, wherein said intermediate memory comprises a level-1 cache memory.

29. The method of claim 15, wherein said reference memory comprises a level-2 cache memory.

30. A machine-readable medium having stored thereon a set of instructions that, if executed by a machine, cause the machine to perform a method comprising updating a variable-size tracking list with an address of a reference memory operatively associated with a processor, which address corresponds to an address of a changed entry in an intermediate memory operatively associated with said processor, wherein the size of the variable-size tracking list corresponds to a current number of changed entries in the intermediate memory, wherein said variable-size tracking list is operably coupled to said processor, and wherein the contents of said intermediate memory are written from the processor exclusive of the contents of said reference memory, wherein updates are only sent from said intermediate memory to said reference memory when a predefined criterion is met, and wherein said reference memory and said intermediate memory are accessible exclusively by said processor.

31. The machine-readable medium of claim 30, wherein the instructions that result in updating the tracking list result in storing a pointer to an address in said reference memory corresponding to the address of the changed entry in said intermediate memory.

32. The machine-readable medium of claim 30, wherein the instructions that result in updating the tracking list result in storing a pointer to the address of the changed entry in said intermediate memory corresponding to the corresponding address in said reference memory.

33. The machine-readable medium of claim 30, wherein the instructions further result in modifying said reference memory based on a content of said tracking list.

34. The machine-readable medium of claim 30, wherein the instructions further result in updating an entry in said reference memory at the address in said reference memory corresponding to the address of the changed entry in said intermediate memory.

35. The machine-readable medium of claim 34, wherein the instructions further result in updating said tracking list to indicate that the address in said reference memory has been updated.

36. The machine-readable medium of claim 30, wherein the instructions further result in updating entries in said reference memory at the addresses in said reference memory corresponding to substantially all addresses of changed entries in said intermediate memory.

37. The machine-readable medium of claim 36, wherein the instructions that result in updating the entries result in updating the entries when said tracking list reaches a pre-determined percentage of its storage capacity.

38. The machine-readable medium of claim 36, wherein the instructions that result in updating the entries result in updating the entries when said intermediate memory reaches a pre-determined percentage of its storage capacity.

39. The machine-readable medium of claim 30, wherein the instructions further result in sorting said tracking list.

40. The machine-readable medium of claim 30, wherein the instructions further result in defragmenting said tracking list.

41. The machine-readable medium of claim 30, wherein the instructions further result in modifying a property of said tracking list.

42. The machine-readable medium of claim 41, wherein the instructions that result in modifying the property of said tracking list result in modifying the size of said tracking list.

43. The machine-readable medium of claim 30, wherein said intermediate memory comprises a level-1 cache memory.

44. The machine-readable medium of claim 30, wherein said reference memory comprises a level-2 cache memory.

45. An apparatus comprising:
a processor, associated with an intermediate memory accessible exclusively by the processor and a reference memory accessible exclusively by the processor, writing the contents of the intermediate memory exclusive of the contents of the reference memory; and
a tracking unit, operably coupled to said processor, updating a variable-size tracking list with an address of the reference memory, which address corresponds to an address of a changed entry in the intermediate memory, wherein the size of the variable-size tracking list corresponds to a current number of changed entries in the intermediate memory, and wherein updates are only sent from said intermediate memory to said reference memory when a predefined criterion is met.

46. The apparatus of claim 45, wherein the processor is writes a pointer to an address in said reference memory corresponding to the address of the changed entry in said intermediate memory.

47. The apparatus of claim 45, wherein the processor writes a pointer to the address of the changed entry in said intermediate memory corresponding to the address in said reference memory.

48. The apparatus of claim 45, wherein the processor updates said reference memory based on a content of said tracking list.

49. The apparatus of claim 45, wherein the processor modifies an entry in said reference memory at the address in said reference memory corresponding to the address of the changed entry in said intermediate memory.

50. The apparatus of claim 49, wherein the tracking unit changes said tracking list to reflect that the address in said reference memory has been updated.

51. The apparatus of claim 45, wherein the processor updates entries in said reference memory at addresses in said reference memory corresponding to substantially all addresses of changed entries in said intermediate memory.

* * * * *